United States Patent
Ramachandran et al.

(10) Patent No.: US 8,934,336 B2
(45) Date of Patent: Jan. 13, 2015

(54) SYSTEM AND METHOD FOR PRESERVING SESSION CONTEXT DURING INTER-RADIO ACCESS TECHNOLOGY SERVICE RETRY

(75) Inventors: Shyamal Ramachandran, San Diego, CA (US); Thomas Klingenbrunn, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 498 days.

(21) Appl. No.: 13/049,182

(22) Filed: Mar. 16, 2011

(65) Prior Publication Data

US 2012/0236709 A1 Sep. 20, 2012

(51) Int. Cl.
*H04L 12/26* (2006.01)
*H04M 11/04* (2006.01)
(Continued)

(52) U.S. Cl.
CPC ............ *H04W 76/027* (2013.01); *H04W 36/02* (2013.01); *H04W 76/045* (2013.01); *H04W 88/06* (2013.01)
USPC .......................... 370/221; 370/235; 455/404.1

(58) Field of Classification Search
CPC . H04W 36/02; H04W 76/027; H04W 76/045; H04W 88/06
USPC ................................ 370/221, 235; 455/404.1
See application file for complete search history.

(56) References Cited

U.S. PATENT DOCUMENTS 6,961,780 B2 11/2005 Kuusinen et al.
7,502,345 B2 3/2009 Aaltonen
(Continued)

FOREIGN PATENT DOCUMENTS

| EP | 1615394 A1 | 1/2006 |
| WO | 2010120689 A2 | 10/2010 |
| WO | WO2011020676 | * 2/2011 ............ H04W 76/02 |

OTHER PUBLICATIONS

"Digital cellular telecommunications system (Phase 2+) ,Universal Mobile Telecommunications System (UMTS) , LTE, Circuit Switched (CS) fallback in Evolved Packet System (EPS), Stage 2 (3GPP TS 23.272 version 9.7.0 Release 9 )", Technical Specification, Europea Telecommunications Standards Institute (ETSI), 650, Route Des Lucioles , F-06921 Sophia-Anti Polis ,France, vol. 3GPP SA 2, No. V9.7.0, Mar. 1, 2011, pp. 1-73, XP014064756.

(Continued)

*Primary Examiner* — Andrew Lai
*Assistant Examiner* — Albert Shih
(74) *Attorney, Agent, or Firm* — Eric Ho

(57) ABSTRACT

A method is provided for facilitating preservation of session context information during an inter-radio access technology service retry. A user equipment (UE) may initiate a data transmission for a first service over a wireless communication session with a first network. Upon ascertaining that the first service has failed over the first network, a failover procedure is initiated by sending a service request for a second service to the first network. The second service may be distinct from the first service and has the effect of suspending the wireless communication session with the first network. The UE then resends the data transmission for the first service over a second network. The UE then resumes use of the wireless communication session over the first network after resending the data transmission over the second network. This resumption is done by using context information for the wireless communication session preserved prior to the suspension.

45 Claims, 14 Drawing Sheets

EXEMPLARY METHOD OPERATIONAL IN A USER EQUIPMENT

(51) Int. Cl.
*H04W 76/02* (2009.01)
*H04W 36/02* (2009.01)
*H04W 76/04* (2009.01)
*H04W 88/06* (2009.01)

(56) References Cited

U.S. PATENT DOCUMENTS

2005/0220079 A1 10/2005 Asokan
2006/0007862 A1* 1/2006 Sayeedi et al. ............... 370/235
2007/0211693 A1 9/2007 Hirsimaki et al.
2010/0054187 A1 3/2010 Hallenstal et al.
2010/0297979 A1* 11/2010 Watfa et al. ............... 455/404.1

OTHER PUBLICATIONS

International Search Report and Written Opinion—PCT/US2012/029527, International Search Authority—European Patent Office, Jul. 23, 2012.

* cited by examiner

EXEMPLARY USER EQUIPMENT

*EXEMPLARY METHOD OPERATIONAL IN A USER EQUIPMENT*

*EXEMPLARY PACKET-SWITCHED NETWORK ENTITY*

*EXEMPLARY METHOD OPERATIONAL IN A PACKET-SWITCHED NETWORK DEVICE*

EXEMPLARY PROTOCOL STACK

*EXEMPLARY PACKET-SWITCHED NETWORK*

SYSTEM AND METHOD FOR PRESERVING SESSION CONTEXT DURING INTER-RADIO ACCESS TECHNOLOGY SERVICE RETRY

BACKGROUND

1. Field

Various features pertain to switching between wireless radio communication systems and more particularly, to a method and device that preserves a current session context when retrying a service on a different radio access technology.

2. Background

A multi-mode user equipment (UE), e.g., mobile communication device, may be capable of operating according to two or more different radio access technologies, such as through packet-switched networks (e.g., a network compliant with a Long Term Evolution (LTE) air interface standard) and circuit-switched networks (e.g., a 1xRTT core CDMA2000 wireless air interface standard). During operation, the UE may register with the packet-switched network, setup a connection or link, and establish a data communication session over an IP Multimedia Subsystem (IMS) (on an LTE compatible network) which it can use for various types of services. For example, the UE may be configured to implement Short Message Service (SMS) services or other applications such as voice communications while operating over an LTE packet-switched network.

In general, LTE packet-switched networks provide centralized control of many UE operations. When the UE is operating in an LTE packet-switched network (i.e., after a successful IMS Registration), it is expected that the UE remain on the LTE packet-switched network for all services or applications. When the user tries to send a mobile originated (MO) service (e.g., SMS), the UE attempts to deliver the service data or messages via the IMS core of the packet-switched network. If the service is unavailable, the UE may receive an error message from the IMS core that is indicative of some error in the service delivery over the IMS plane.

The multi-mode UE may be capable of switching its serving or active radio access technology to implement the service (e.g., SMS) directly over a circuit-switched (CS) network/domain (e.g., 1xRTT, GERAN, UTRAN). That is, the UE may switch from its LTE interface to, for example, a 1xRTT interface to retry sending the service data or messages. However, in LTE packet-switched networks, the LTE network controls the connection or link established with the UE. That is, the LTE network operates under the assumption that the UE will continue to communicate over the LTE packet-switched network. Therefore, the UE cannot simple abandon its connection or link with the LTE packet-switched network without losing incoming pages on LTE air interface.

Therefore, a procedure is needed to execute inter-radio access technology (RAT) retries for certain services in a manner that is transparent to the UE ("silent redial") and does not result in data loss or context loss for the UE over the LTE packet-switched network.

SUMMARY

A system, apparatus, and/or methods are provided for dynamically switching a wireless radio interface of a user equipment (UE) from a first network (e.g., packet-switched network) to a second network (e.g., circuit-switched network), without the risk of paging or data loss from the first network.

According to a first aspect, a method operational on a multi-modal user equipment is provided for preserving session context during a transmission failover procedure. The user equipment may perform a registration process to register with a first network, thereby establishing a wireless connection between the user equipment and the first network. Subsequently, the user equipment may establish a wireless communication session via the wireless connection. In one example, the wireless connection may be implemented at a lower layer of a protocol stack of the user equipment than the wireless communication session.

A data transmission may be initiated for a first service over the wireless communication session with a first network. If it is ascertained that the first service has failed over the first network, the user equipment sends a service request for a second service to the first network, where the second service is distinct from the first service and has the effect of suspending the wireless communication session with the first network. Suspending the wireless communication session with the first network may include preserving context information for the wireless communication session. The user equipment then resends the data transmission for the failed first service over a second network. Use of the wireless communication session over the first network may be resumed after resending the data transmission over the second network. In one example, resuming use of the wireless communication session may include (a) establishing a new wireless connection between the user equipment and the first network, and/or (b) reestablishing the wireless communication session via the new wireless connection by using context information for the wireless communication session preserved prior to the suspension of the wireless communication session.

In one example, the service request may be an extended service request message that is used to indicate that the user equipment is initiating a voice call service. The user equipment may forego subsequent steps for the second service to instead resend the data transmission for the failed first service over the second network. Sending the service request for the second service and resending the data transmission for the failed first service may be automatic and transparent to an operator of the user equipment.

Note that resending the data transmission over the second network may involve prior steps of (a) registering the user equipment with the second network and/or (b) establishing a second wireless communication session between the user equipment and the second network.

In various examples, ascertaining that the first service has failed over the first network may include: (a) receiving a service failure indicator from the first network indicating that the data transmission for the first service has failed, and/or (b) independently determining that the first service is unavailable via the first network.

In one example, the first network is a packet-switched network and the second network is a circuit-switched network. For instance, the first network is a long term evolution (LTE) packet-switched network.

Consequently, a user equipment may be provided comprising a wireless communication device and a processing device. The wireless communication device may be adapted to communicate over at least a first network and a second network. The processing device may be coupled to the wireless communication device and configured to: (a) initiate a data transmission for a first service over a wireless communication session with the first network, (b) ascertain that the first service has failed over the first network, (c) send a service request for a second service to the first network, where the second service is distinct from the first service and has the effect of suspending the wireless communication session with the first network, (d) resend the data transmission for the failed first service over the second network, and/or (e) resume use of the wireless communication session over the first network after resending the data transmission over the second network. The first network may be a packet-switched network and the second network may be a circuit-switched network.

According to a second aspect, a method operational on a packet-switched network device is provided for preserving session context during a transmission failover procedure of a user equipment. The packet-switched network device may receive a registration request from the user equipment and establishes a wireless communication session between the user equipment and the first network. The network device may receive a data transmission for a first service over the wireless communication session with a user equipment. In response, the packet-switched network device may send a service failure indicator to the user equipment indicating that the data transmission for the first service has failed. The packet-switched network device may then receive a service request for a second service from the user equipment, where the second service is distinct from the first service and has the effect of suspending the wireless communication session with the user equipment. Suspending the wireless communication session with the first network may include preserving context information for the wireless communication session. In one example, the service request for the second service may be an extended service request that is used to indicate that the user equipment is initiating a voice call service.

During suspension of the wireless communication session with the first network, the user equipment may resend the data transmission for a first service over a second network.

While the wireless communication session is suspended, the network device may buffer paging messages for the user equipment. An indicator to resume the wireless communication session with the user equipment may be subsequently received by the network device. Upon resumption of the communication session, the network device may send the buffered paging messages to the user equipment. Thus, the network device may resume activity over the wireless communication session with the user equipment. Resuming use of the wireless communication session may include (a) establishing a new wireless connection between the user equipment and the first network, and/or (b) reestablishing the wireless communication session via the new wireless connection by using context information for the wireless communication session preserved prior to the suspension of the wireless communication session. Note that, in one example, if the wireless communication session has been suspended for longer than a threshold amount of time, the communication session is terminated.

In one example, the first network may be a packet-switched network such as a long term evolution (LTE) packet-switched network. The second network may be a circuit-switched network.

Consequently, a packet-switched network entity may be provided comprising a wireless communication device and a processing device. The wireless communication device may be adapted for communicating with one or more user equipment and a core network. The processing device may be coupled to the wireless communication device and configured to: (a) receive a data transmission for a first service over a wireless communication session with a user equipment, (b) send a service failure indicator to the user equipment indicating that the data transmission for the first service has failed, (c) receive a service request for a second service from the user equipment, where the second service is distinct from the first service and has the effect of suspending the wireless communication session with the user equipment, (d) buffer paging messages for the user equipment while the wireless communication session is suspended, (e) receive an indicator to resume the wireless communication session with the user equipment, (f) send the buffered paging messages to the user equipment, and/or (g) resume activity over the wireless communication session with the user equipment. During suspension of the wireless communication session with the first network, the user equipment may resend the data transmission for a first service over a second network. The core network may include an internet protocol multimedia subsystem (IMS).

BRIEF DESCRIPTION OF THE DRAWINGS

The features, nature, and advantages of the present features may become more apparent from the detailed description set forth below when taken in conjunction with the drawings in which like reference characters identify correspondingly throughout.

DETAILED DESCRIPTION

Figure 1:
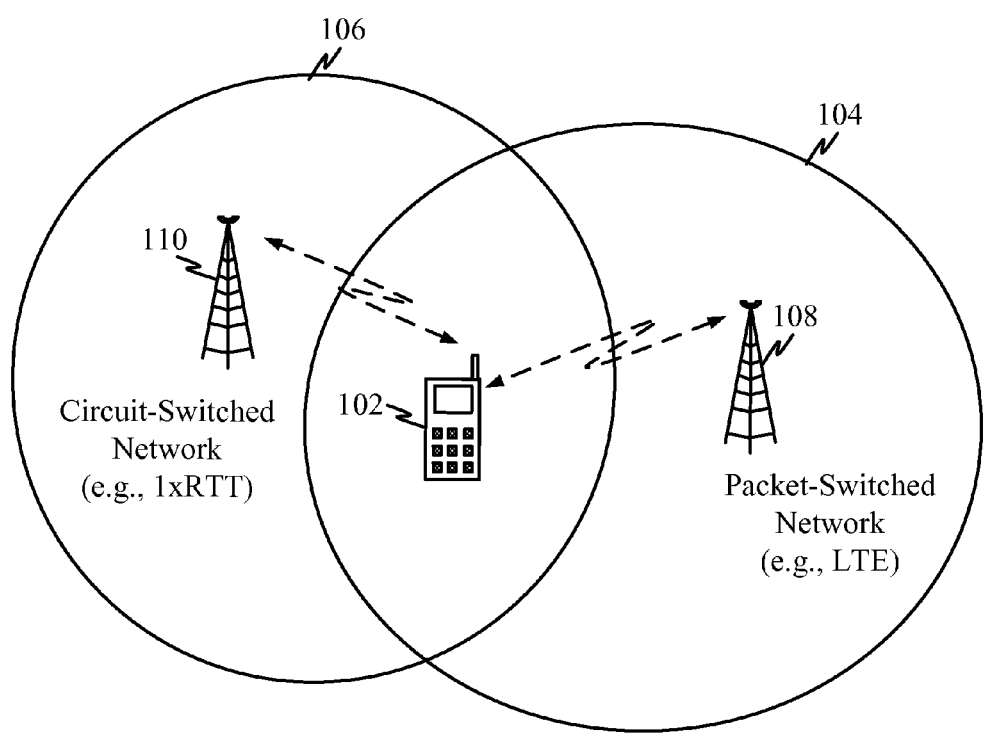
FIG. 1 is a block diagram illustrating a wireless communication system in which a wireless multi-modal user equipment may be adapted to communicate over a packet-switched network and/or a circuit-switched network.

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may not be shown in detail in order not to obscure the embodiments.

In the following description, certain terminology is used to describe certain features of one or more embodiments. The term "access node" may include base stations, Node-B devices, femto cells, pico cells, etc. The term "user equipment" or "UE" refers to mobile phones, pagers, wireless modems, personal digital assistants (PDAs), personal information managers (PIMs), palmtop computers, laptop computers, and/or other wireless or mobile communication/computing devices which communicate, at least partially, through one or more wireless, cellular, communication, and/or data networks. The term "network entity" may refer to one or more devices that are part of a network and/or perform one or more network functions (e.g., authenticate a user equipment, establish a communication connection with a user equipment, etc.). The term "connection" may refer to a wireless communication link which may occur at lower levels of a protocol stack that includes one or more physical and/or logical channels, radio bearers, slots, etc., which is established between a serving network and a user equipment, assigned to individual user equipment and/or shared by a plurality of user equipment. The terms "session" and/or "communication session" refer to establishment of communications at higher levels of a protocol stack (in comparison to a connection which occurs at lower levels of a protocol stack. The term "circuit-switched network" refers to networks that use dedicated point-to-point connections during communication sessions or calls. The term "packet-switched network" refers to networks that move data in separate, small blocks (e.g., packets) based on the destination address in each packet. The term "failover" refers to a retry procedure where if a service or transmission fails over a first network it is retried over a second network.

Overview

One feature provides a system, apparatus, and method for dynamically switching a wireless radio interface of a user equipment (UE) from a first network (e.g., packet-switched network) to a second network (e.g., circuit-switched network), without the risk of paging or data loss from the first network. The UE may have an active session and/or connection with the first network. One or more services may be established by the UE as part of the session and over the connection. For instance, applications operating on the UE can use the one or more sessions and corresponding connections to transmit and/or receive data associated with various services. However, there are times when data transmissions associated with a first service fail (e.g., due to network problems). A multi-modal UE may be able to communicate over different types of networks (e.g., on the same or different frequency channels or bands). Thus, such UE may be capable of retrying the data transmission for the first service over the second network if said data transmission fails over the first network.

In some instances however, the first network may lack a mechanism to gracefully suspend communications and change over to the second network without the potential or risk of loss of data. In the absence of a specific request or command that allows the UE to suspend (but not terminate) its session with the first network and perform a failover that is transparent to the operator of the user equipment, the UE may exploit a different (extended) service request that has the effect of temporarily suspending the session over the first network. For instance, if the first service fails over the first network, the UE may initiate suspension of the session by tricking the first network into believing that a second service (e.g., a service different from the first service) is being initiated by the UE. The suspension of the session allows the context for the session to be maintained while the first network can buffer paging messages. The UE may then try to retransmit the data for the first service over the second network. The UE may subsequently resume its session with the first network. Note that as a result of suspending the session, both the UE and one or more entities of the first network retain context information for the session (e.g., session bearers, IP addresses, packet data context, etc.). Because session context is maintained, the session may be subsequently resumed without loss of data. For instance, upon resumption of the session, the first network may send any buffered paging messages to the UE.

In one example, a user equipment (UE) operating on an LTE packet-switched network may attempt to transmit data for a first service over as part of a session having an associated wireless connection. Upon receiving an indictor that the data transmission failed over the LTE packet-switched network, the user equipment may initiate a failover procedure. The user equipment may send an extended service request (ESR) message to the LTE packet-switched network, which is typically used to initiate voice call service, thereby causing the LTE packet-switched network to suspend (but not terminate) the packet-switched session with the user equipment. That is, one or more resources (e.g., session bearers, IP address, packet data context, etc.) associated with the wireless session are preserved. In various examples, the ESR message may be used to indicate to the first network that the voice call service will be initiated over the circuit-switched network. The user equipment may then retransmit the data for the first service over a circuit-switched network. Upon completion, the user equipment may resume the service over the packet-switched session over a connection with the LTE packet-switch network. This failover process may be completely transparent to the operator of the user equipment (i.e., without notification to, and/or involvement of, the user) and may be performed automatically upon failure of a service transmission.

Exemplary Operating Network Environment

FIG. 1 is a block diagram illustrating a wireless communication system in which a wireless multi-modal user equipment 102 may be adapted to communicate over a packet-switched network 104 (e.g., an LTE-compatible network) and/or a circuit-switched network 106. The user equipment 102 may include, for example, an access terminal, a mobile telephone, a mobile/wireless communication device, a laptop computer, etc. The user equipment 102 may include communication capabilities that allow it to communicate over different types of networks, networks utilizing different frequency bands or channels, and/or networks that operate according to different communication standards and/or protocols. In this example, the user equipment 102 may be operating within range of both the packet-switched network 104 and the circuit-switched network 106.

The packet-switched network 104 may be any digital network in which data (i.e., irrespective of content, type, and/or structure) is transmitted in suitably-sized blocks (called packets) over a shared communication path or channel. In the packet-switched network 104, a plurality of user equipment (e.g., communication devices) may monitor the shared communication path or channel for data, using headers in the packets to identify the intended recipient of each packet. In one example, such packet-switched network 104 may efficiently use bandwidth resources since several user equipment may use a shared communication channel, reducing wasted or unused bandwidth. An example of a packet-switched network includes an LTE-compatible network (also known as an evolved UMTS Terrestrial Radio Access Network (E-UTRAN)).

The circuit-switched network 106 may be any network in which, prior to communications, a dedicated communication path or channel (i.e., a connection) is established between two communicating devices, providing synchronous or asynchronous data transfers without necessarily requiring packets. While the dedicated communication path or channel may allow more efficient communications between the two communicating devices, it is also wasteful of bandwidth resources since other devices cannot utilize unused bandwidth of the dedicated communication path or channel. An example of a circuit-switched network includes a public switched telephone network (PSTN) or a GSM network.

In typical operation, the user equipment 102 may register with the packet-switched network 104 and then sets up a session with another entity over a connection or link with a serving access node for the packet-switched network 104. A service may then be established over the session and connection, allowing the user equipment 102 to transmit and/or receive data associated with the service. As used herein, a session may be established and maintained at higher levels of a protocol stack while a connection or link is established and/or maintained at lower levels of the protocol stack. For example, a session may be established between the user equipment 102 and the mobility manager 204 or via a mobility manager with a networked device coupled to the packet-switched network. A connection may be established between the user equipment 102 and a local access node 202 for the packet-switched network 104.

A failure or interruption may occur over the packet-switched network 104, causing data failures or interruptions of one or more of the services. Consequently, the user equipment 102 may be configured with a failover procedure that, upon detection of a data failure (for a particular service) over the packet-switched network 104, the user equipment 102 may automatically retry the data transmission (for the service) over the circuit-switched network 106.

However, some packet-switched networks implement a network-centric resource control, where the network closely controls the establishment and breakdown of session, connections/links and/or communication channels. Consequently, there may not be a mechanism that allows a user equipment to gracefully suspend the session over the packet-switched network and initiate the data transmission retry over the circuit-switched network without the potential loss of incoming paging messages or data transmission from the packet-switched network.

For example, in LTE-compatible packet-switched networks (e.g., E-UTRAN networks), there is no current mechanism to suspend (but not terminate or teardown) a session with the packet-switched network and retry a data transmission (e.g., for a service) by via the circuit-switched network. That is, the LTE-compatible packet-switched network does not expect the user equipment to terminate its session and/or connection on the packet-switched network unless indicated by the packet-switched network. Even if the user equipment unilaterally switches from the packet-switched network to the circuit-switched network, the user equipment risks missing paging messages and/or data transmissions from the packet-switched network since the packet-switched network is unaware that the user equipment is no longer monitoring its session and/or connection with the packet-switched network. Additionally, completely terminating the session and connection with the packet-switched network may also result in the loss of routing information to the user equipment. In particular, if context information for the session is lost, it takes considerably longer to reestablish the session once the user equipment switches back to the packet-switched network.

To address this problem, one feature provides for the user equipment 102 to reuse an existing network protocol command, message, or request, typically defined for a different purpose, to suspend (but not completely teardown) a communication session with the packet-switched network 104. For example, in an LTE-compatible packet-switched network 104, the user equipment 102 may send an extended service request (ESR) message, which is often used to initiate a voice call over the circuit-switched network 104. Because the user equipment 102 does not perform the additional steps for initiating a voice call over either the circuit-switched network or the packet-switched network, the ESR message merely suspends the previously established communication session over the packet-switched network 104. This suspension allows the user equipment 102 to retry the previously failed data transmission (e.g., for the service) over the circuit-switched network 106. Upon retransmitting the data over the circuit-switched network 106, the user equipment 102 may resume communications over the previously established communication session with the packet-switched network 104.

Exemplary Packet-Switched to Circuit-Switched Network Failover System

Figure 2A:
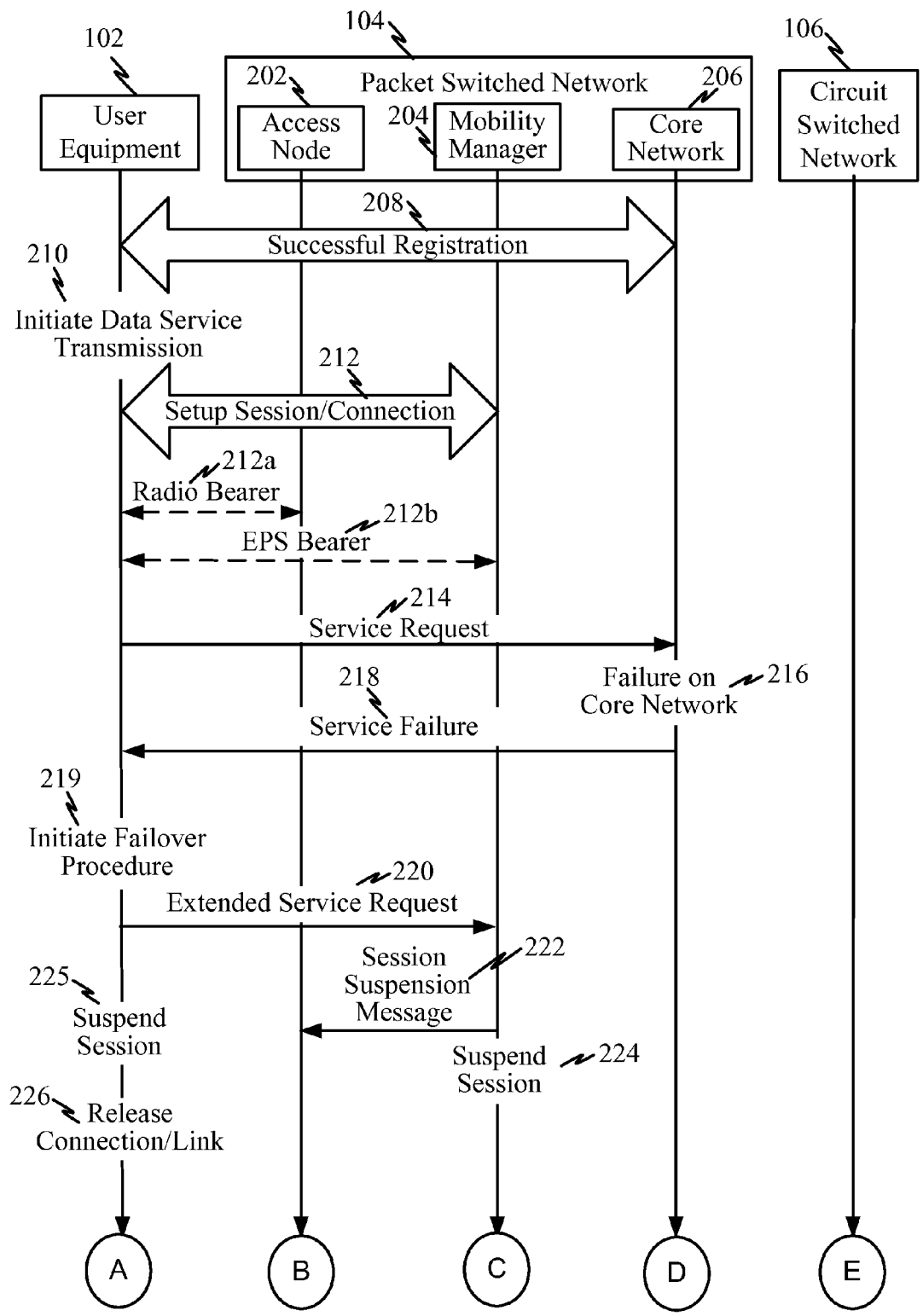
FIG. 2 (comprising FIGS. 2A and 2B) is a flow diagram illustrating the operations between a user equipment, a packet-switched network, and a circuit-switched network to implement failover data retransmissions.
Figure 2B:
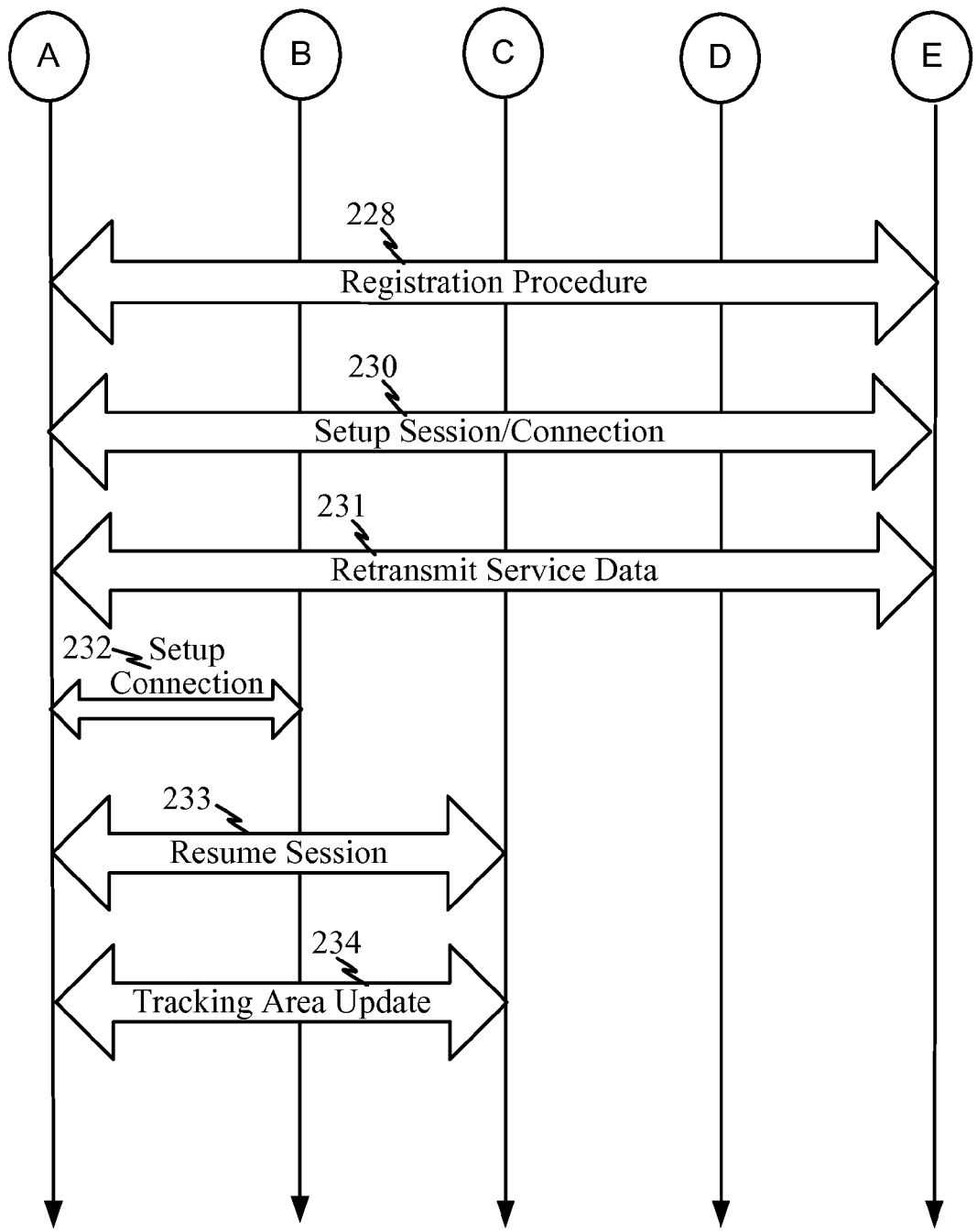

FIG. 2 (comprising FIGS. 2A and 2B) is a flow diagram illustrating the operations between a user equipment, a packet-switched network, and a circuit-switched network to implement failover data retransmissions. Here, the packet-switched network 104 may generally comprise an access node 202, a mobility manager 204 and/or a core network 206 (e.g., an evolved packet system (EPS) network which may include an IP Multimedia Subsystem (IMS)). The access node 202 and mobility manager 204 may be part of an LTE network that provides access to the core network 206. The access node 202 may provide wireless (over-the-air) connectivity between the user equipment 102 and other entities of the packet-switched network 104. The mobility manager 204 may serve to track the movement of the user equipment among network cells, establish and/or maintain sessions, and send paging messages. The core network 206 may include components that perform authentication, registration, and/or establish/maintain communication sessions.

The user equipment 102 may perform successful registration 208 with the packet-switched network 104 (e.g., via the core network 206). With such registration, the user equipment 102 can be located by other devices via the packet-switched network 104. The user equipment 102 may wish to initiate a data service transmission 210 over the packet-switched network 104. Consequently, a session and connection 212 are setup with the packet-switched network 104. For instance, a radio bearer connection 212a may be established with the access node 202 and then an evolved packet system (EPS) session bearer 212b is established with or via the mobility manager 204. Each session may be associated with a separate or distinct IP address (or obtains a distinct IP address) that is used to identify the session and/or communicate with other devices/servers. The session may be established at higher levels of a protocol stack (such as a Non-Access Stratum layer). Session information or context may include one or more session bearers (also known as EPS bearers), session IP address, packet data context, etc. The connection may occur at a lower level of the protocol stack to setup a radio link with a serving access node. At the connection level, one or more radio bearers are setup that correspond to the session bearers. In one example, one radio bearer may correspond to one session bearer.

A service may be established over the session and connection 212. For instance, a service request 214 may include, be part of, and/or serves to transmit data for a first service. For example, such service request 214 may be a Short Messaging Service (SMS) message (such as SMS message 922 in FIG. 9A), a voice-over-IP service message, or any other type of service and/or message. In some instances, a service failure 216 may occur beyond the control of the mobility manager 204 or even a locally serving network. Note that the LTE network (e.g., access node 202 and mobility manager 204) may operate as a conduit to the core network 206. Thus, the LTE network may be unaware of whether a particular service is available or unavailable on the core network 206 (e.g., IMS network). In fact, the user equipment 102 may be able to ascertain that a particular service is unavailable on the core network 206 before the LTE network (e.g., access node 202 and mobility manager 204) realizes there is a service failure.

If a failure 216 of a service over the packet-switched core network occurs (e.g., the service data transmission fails), the core network 206 sends a communication session failure message 218 to the user equipment 102. For example, if the service requested is SMS over Session Initiation Protocol (SIP), then a SIP error indication (as in 926 in FIG. 9A) may be received upon failure of such service. Alternatively, the user equipment 102 may, independently ascertain or determine that the packet-switched network 104 is unable to provide a desired service. For example, if the user equipment 102 is roaming and knows it is operating on a visited LTE network (e.g., access node 202 and mobility manager 204) in a particular geographical region and the core network 206 is located in a distant geographical region, it may be able to ascertain that a particular service may not be possible, feasible, or likely. Therefore, the user equipment 102 may unilaterally decide to initiate the failover procedure, either before or after attempting the service (e.g., sending service request 214 and/or receipt of service failure 218) over the packet-switched network.

Upon receipt of the failure message 218 (or in expectation of a service failure), the user equipment 102 may initiate a failover procedure 219. The failover procedure may attempt to retry a failed service (e.g., retransmit one or more failed messages or date) over a different network. For instance, such failover procedure may attempt to reestablish the communication session (e.g., retransmit data for the service) over the circuit-switched network 106. To do this, an extended service request 220 may be sent by the user equipment 102 to the packet-switched network (i.e., to the mobility manager 204), tricking the packet-switched network into believing such extended service is being requested or initiated by the user equipment 102. Note that the extended service request 220 may be for a different service (e.g., second service) or different type of service than the first service for which data transmission failed over the packet-switched network 104. In the absence of a designated operation, command, and/or request that allows the user equipment 102 to specifically suspend (but not terminate or teardown) the session with the packet-switched network 104, the extended service request 220 may be selected to directly or indirectly accomplish this. Such extended service request 220 may typically be designated to accomplish or initiate a different operation or service (e.g., a second service like a voice call) over the circuit-switched network, which has the direct or indirect effect or consequence of also suspending (but not terminating or tearing down) the session between the user equipment 102 and the packet-switched network 104. Rather than performing all operations associated with the extended service request 220, the user equipment 102 may ignore or forgo subsequent operations associated with the second service. Therefore, the packet-switched network 104 may suspend the communication session with the user equipment 102 but remaining operations associated with the extended service request 220 are not performed by the user equipment 102.

As part of processing the extended service request 220, a session suspension message 222 or command may be sent to the access node 202. The mobility manager 204 may then suspend the session 224 such that it buffers or withholds paging messages intended for the user equipment 102 while the session is suspended. Suspending the session 224 avoids sending unnecessary and/or wasteful paging messages to the user equipment 102 when it is not monitoring session/connection with the packet-switched network 104.

The user equipment 102 may suspend the session 225 and release the corresponding connection 226 and initiate a handover procedure to the circuit-switched network 106. To do this, the user equipment 102 may perform a circuit-switched network registration procedure 228. Upon successfully performing such registration 228, the user equipment 102 may setup a session and/or connection 230 with the circuit-switched network 106. The user equipment 102 may then attempt to retransmit the service data 231 from the failed packet-switched data communication session 214 (e.g., first service) over the circuit-switched network 106. After such retransmission is completed over the circuit-switched network 106, the user equipment 102 may setup a connection 232 over the packet-switched network and the resumes the session 233. In order to update the mobility manager 204, an area tracking update procedure 234 may be performed between the user equipment 102 and the mobility manager 204. This may be sufficient to inform the packet-switched network 104 that the connection is being reestablished.

Exemplary User Equipment and Method

Figure 3:
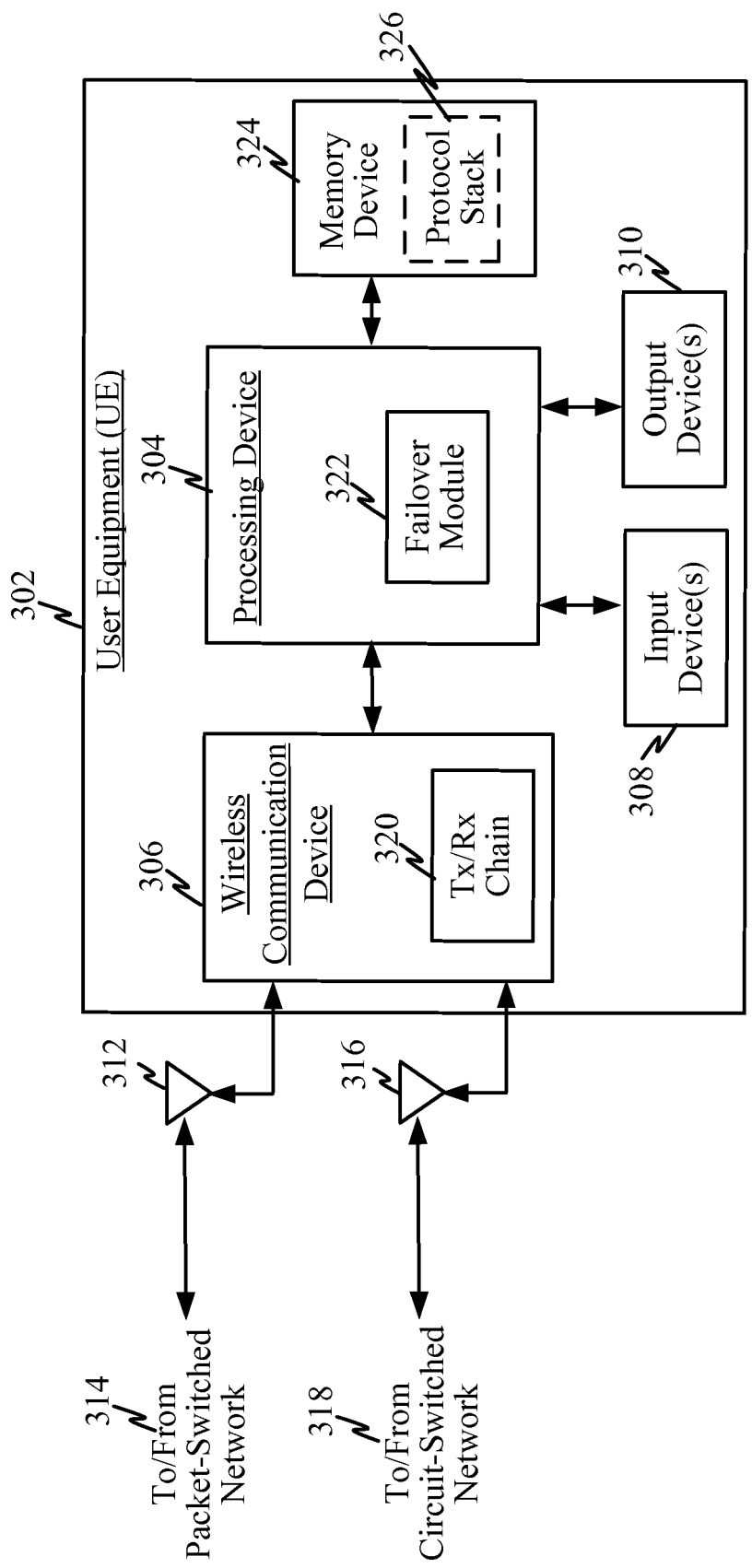
FIG. 3 is a block diagram illustrating an exemplary multi-modal user equipment configured to failover from a packet-switched network to a circuit-switched network without losing all session context with the packet-switched network.

FIG. 3 is a block diagram illustrating an exemplary multi-modal user equipment configured to failover from a packet-switched network to a circuit-switched network without losing all context with the packet-switched network. The multi-mode user equipment (UE) 302 (e.g., mobile communication device) may be capable of operating according to two or more different radio access technologies, such as through packet-switched networks (e.g., a network compliant with a Long Term Evolution (LTE) air interface standard) and circuit-switched networks (e.g., a 1xRTT core CDMA2000 wireless air interface standard).

In one example, the user equipment 302 may include a processing device or circuit 304 coupled to a wireless communication device 306, one or more input devices 308, and/or one or more output devices 310. The one or more input devices 308 may include a microphone, a camera, a keypad, a touch screen, among other devices that allow a user to enter content (e.g., voice, data, text, multimedia, etc.). The one or more output device 310 may include a speaker, a display screen, etc. that allow outputting content (e.g., voice, data, text, multimedia, etc.). The wireless communication device 306 may include a radio transmitter and/or a radio receiver including, for example, one or more transmitter/receiver chains 320. The wireless communication device 306 may be coupled to one or more antennas 312 and 316 that permit the user equipment to communicate to/from a first network (e.g., packet-switched network 314) and/or a second network (e.g., circuit-switched network 318). Additionally, the user equipment 302 may include a memory device 324 coupled to the processing device 304. The memory device 324 may serve to implement a protocol stack 326. The processing device 304 may include a failover module 322 that, upon failure of a data transmission or service over the packet-switched network 314, is adapted to retry the data transmission or service via the circuit-switched network 318. To avoid delays in restarting communications over the packet-switched network 314, the failover (from the packet-switched network 314 to the circuit-switched network 318) is performed without fully closing or terminating the session between the user equipment 302 and the packet-switched network 314. That is, the session with the packet-switched network 314 may be at least partially maintained so that core network context is preserved or maintained. For example, core network context includes the user equipment's session context (e.g., packet data context, EPS bearer(s), and internet protocol (IP) address(es)). The memory device 324 may serve to temporarily store the session context. In some implementations, the core network context may exclude radio level context, and/or physical and radio bearers.

In one example where the user equipment communicates over an LTE network, the failover procedure may involve sending an extended service request (ESR) message, which causes the LTE to think that a voice communication is being initiated by the user equipment over a circuit-switched network. As a result, the LTE network suspends (but does not tear down) the session with the user equipment.

Figure 4:
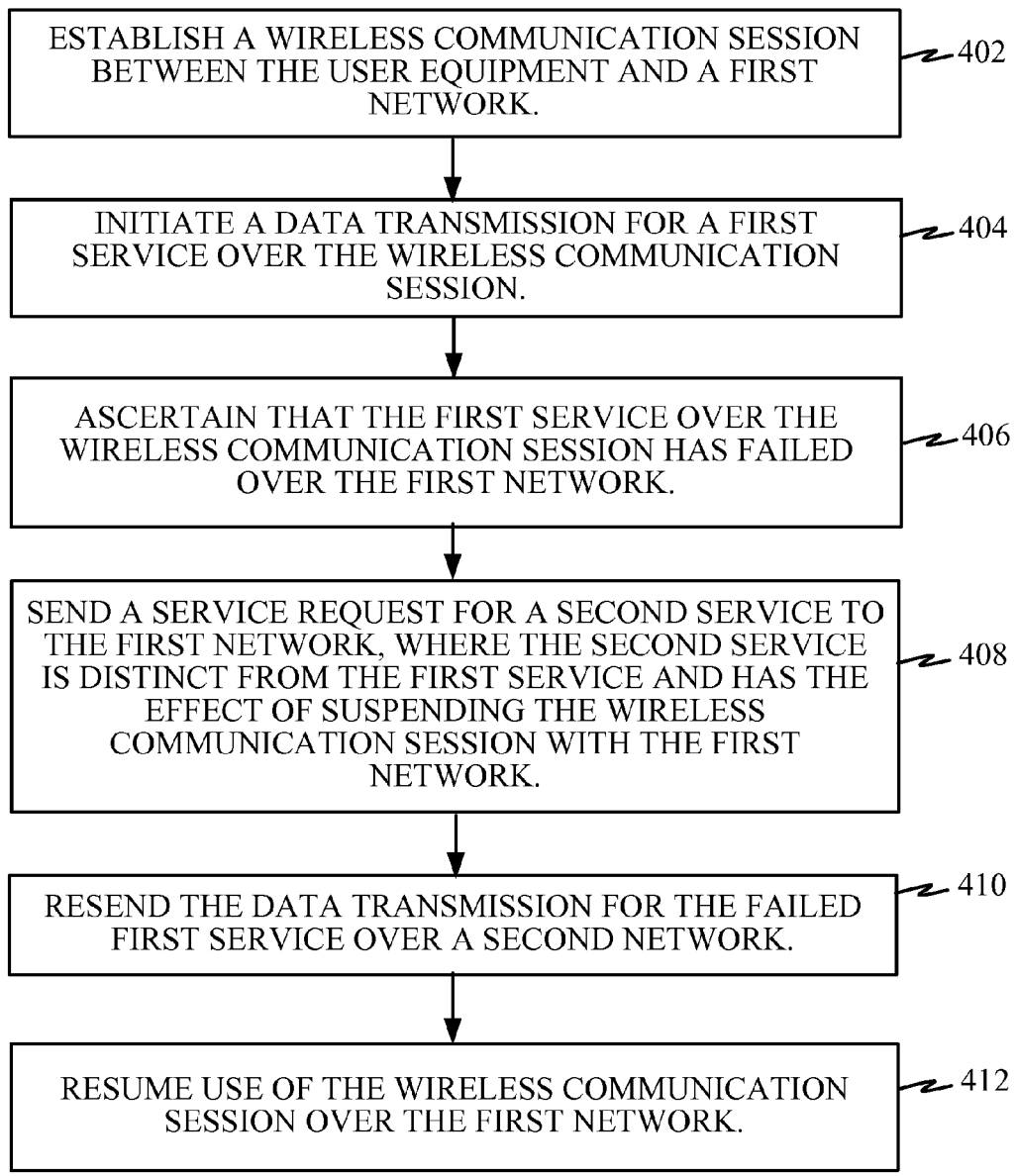
FIG. 4 is a flow diagram illustrating an exemplary method operational in a user equipment to perform failover from a first network to a second network without losing a wireless communication session with the first network.

FIG. 4 is a flow diagram illustrating an exemplary method operational in a user equipment to perform failover from a first network (e.g., a packet-switched network) to a second network (e.g., a circuit-switched network) without losing a wireless communication session with the first network. In some examples, the first and second networks may be different types of networks (e.g., packet-switched versus circuit-switched networks). A wireless communication session is established between the user equipment and first network 402. For example, the session may be established between higher protocol layers of the user equipment and the first network (e.g., a device or entity coupled to the first network). Establishment of the session may trigger establishment of a connection or link at lower protocol layers between the user equipment and (serving access node) the first network. The user equipment may then initiate a data transmission for a first service over the wireless communication session 404. For example, this may involve transmission of data associated with a particular service (e.g., SMS service). The user equipment may ascertain that the first service over the wireless communication session has failed (or will fail) over the first network 406. For instance, the user equipment may receive a service failure indicator (e.g., SIP error indication 926 in FIG. 9A) from the first network indicating that the first service has failed 406. Alternatively, the user equipment may independently determine that the first service is unavailable via the first network (e.g., from prior communications via the first network or from other information previously known about services available over the first network).

As a result of the failure indicator (or independent determination by the user equipment that the first service is unavailable via the first network), the user equipment may initiate a failover procedure. The user equipment may send an extended service request for a second service to the first network, where the second service is distinct from the first service and has the effect of suspending the wireless communication session with the first network 408. That is, the second service may be, for example, a voice call request while the first data service may be, for example, Short Messaging Service (SMS). Suspending the wireless communication session with the first network may include preserving context information for the wireless communication session. The user equipment may then purposely forego or fail to carry through subsequent steps for the second service. Instead, the user equipment retries/resends the data transmission for the first service over the second network 410. Once it has retransmitted the data transmission over the second network, the user equipment resumes the wireless communication session over the first network 412. Such resumption may include establishing a connection with the first network and informing the first network that the user equipment is again using the wireless communication session. For example, resuming use of the wireless communication session may include (a) establishing a new wireless connection between the user equipment and the first network, and/or (b) reestablishing the wireless communication session via the new wireless connection by using context information for the wireless communication session preserved prior to the suspension of the wireless communication session.

Figure 5:
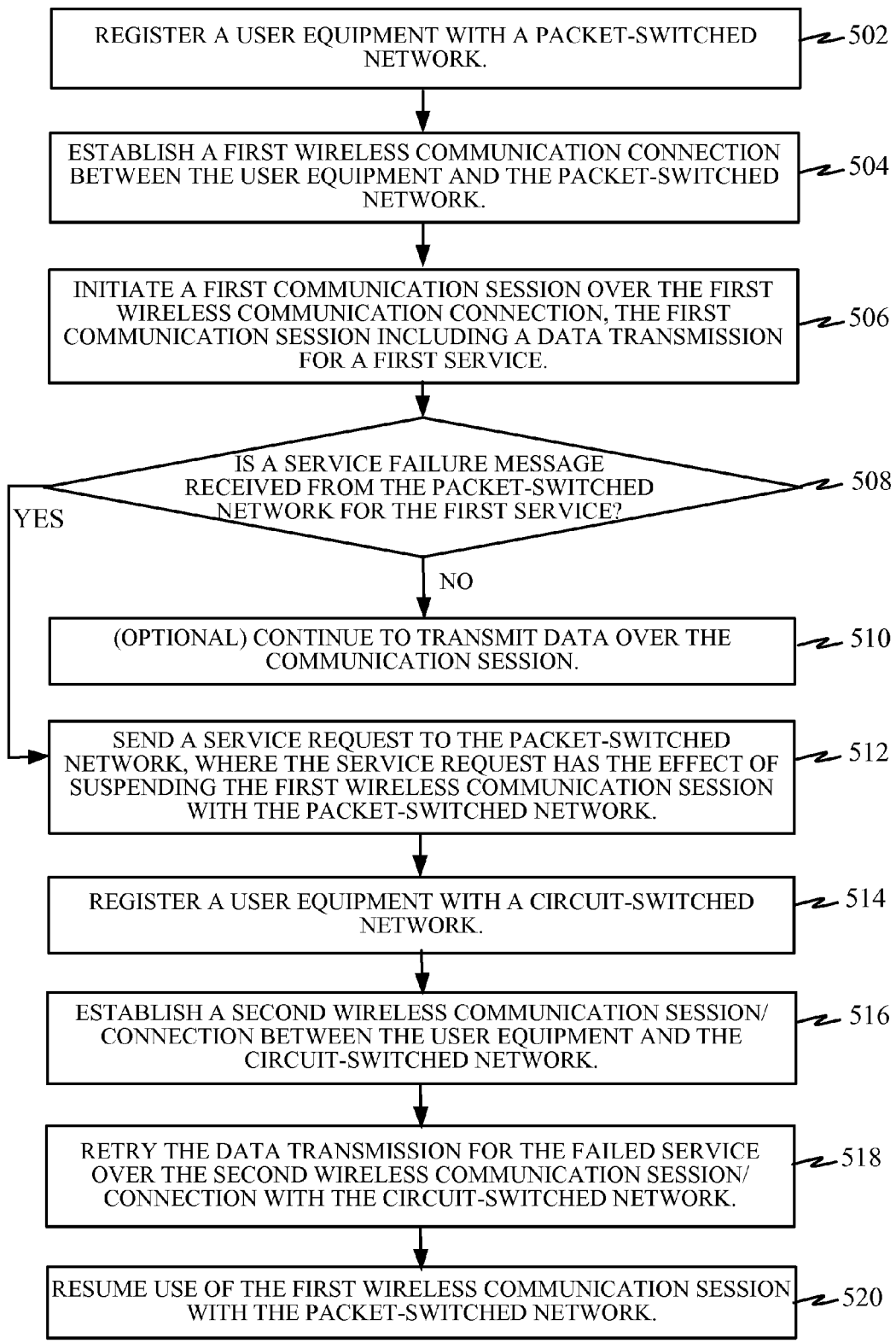
FIG. 5 is a flow diagram illustrating another exemplary method operational on a user equipment to perform failover from a packet-switched network to a circuit-switched network without losing all session context with the packet-switched network.

FIG. 5 is a flow diagram illustrating another exemplary method operational in a user equipment to perform failover from a packet-switched network to a circuit-switched network without losing all session context with the packet-switched network. Initially, the user equipment registers with a packet-switched network 502. Then a first wireless communication connection is established between the user equipment and the packet-switched network 504. The user equipment may then initiate a first communication session over the first wireless communication connection, the first communication session including a data transmission for a first service 506. Note that the connection may be associated with, and triggered by, establishment of the session. The user equipment may then ascertain whether a service failure message is received from the packet-switched network 508. For example, one example of such service failure message may be a SIP error indicator 926 in FIG. 9A. If no failure message or indicator is received, then the user equipment may continue to transmit data over the first communication session 510 (or at least may assume that such data transmission was successful).

On the other hand, if a failure message or indicator is received, then the user equipment may initiate a failover procedure over the circuit-switched network. To do this, the user equipment sends a service request (e.g., extended service request in LTE networks) to the packet-switched network, where the service request has the effect of suspending (but not terminating or tearing down) the first wireless communication session with the packet-switched network 512. Note that the service request may be for a different type of service than the first service. The user equipment may then, optionally, register with the circuit-switched network 514 and establish a second wireless communication session/connection between the user equipment and the circuit-switched network 516. The user equipment may then retry the data transmission for the failed service over the second wireless communication session/connection with the circuit-switched network 518. The user equipment may then resume use of the first wireless communication session with the packet-switched network 520.

Exemplary Packet-Switched Network System and Method

Figure 6:
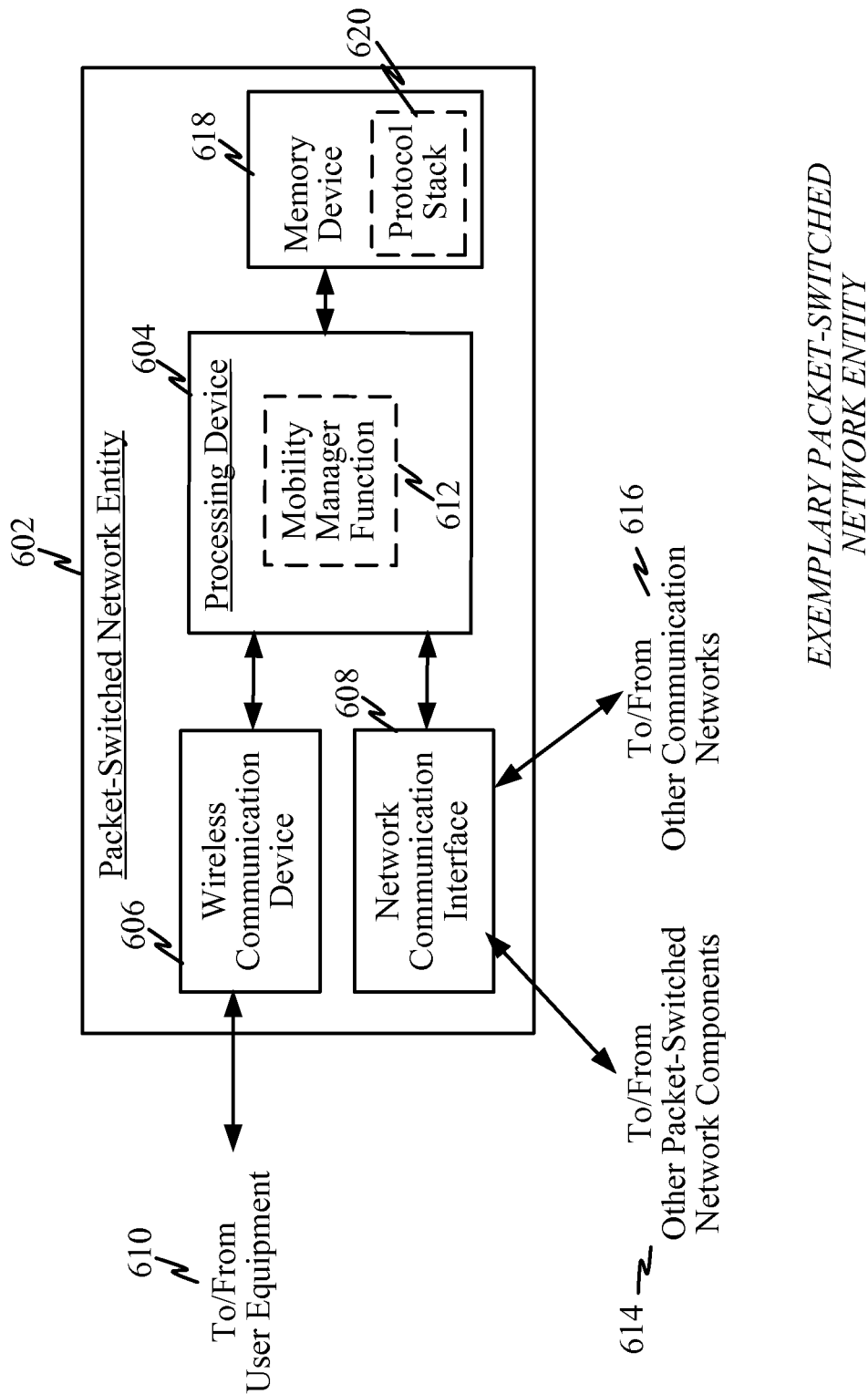
FIG. 6 is a block diagram illustrating an exemplary packet-switched network device configured to provide communication connectivity to one or more user equipment.

FIG. 6 is a block diagram illustrating an exemplary packet-switched network entity configured to provide communication connectivity to one or more user equipment. In this example, the packet-switched network entity 602 may include a processing device 604 (e.g., one or more circuits and/or processors), a wireless communication device 606, and/or a network communication interface 608. The wireless communication device 606 may include a transmitter/receiver circuit that allows the packet-switched network entity 602 to communicate to/from one or more user equipment 610. The network communication interface 608 allows the packet-switched network entity 602 to communicate with one or more other packet-switched network components 614 or with other communication networks 616. A memory device 618 may be coupled to the processing device 604 and serves to maintain a protocol stack 620.

In one example, the packet-switched network entity 602 may be an access node (e.g., an eNB for an LTE network) that operates as a conduit to receive communications from and/or transmit communications to a user equipment.

In another example, the packet-switched network entity 602 may include a plurality of network devices or functionality of such devices. For instance, the packet-switched network entity 602 may include an access node and a mobility manager entity. The processing device 604 may include a plurality of processing devices or circuits (on the same or different network devices) to perform one or more network functions, including for example a mobility manager function 612.

Figure 7:
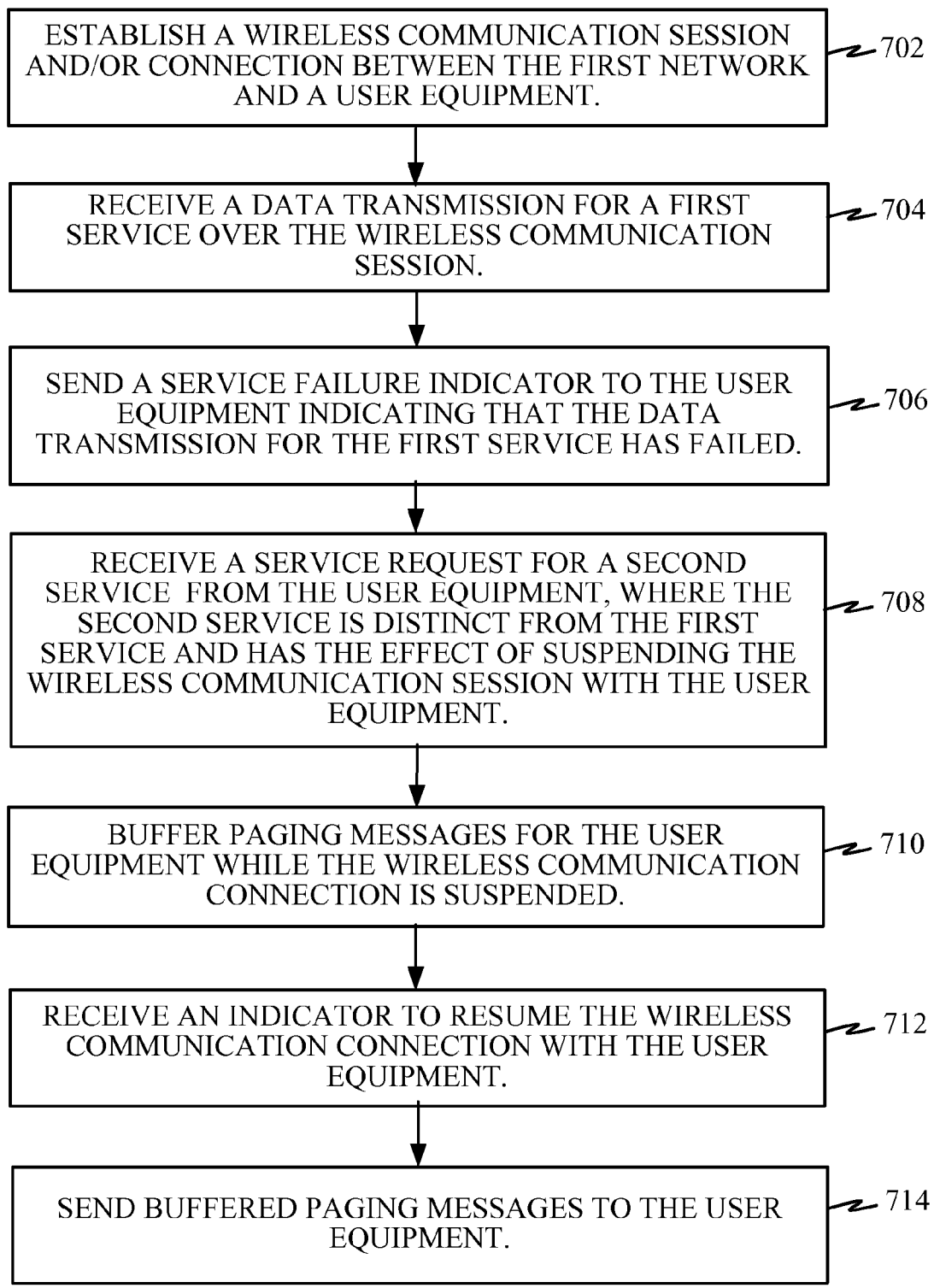
FIG. 7 is a flow diagram illustrating an exemplary method operational in a first network entity that facilitates a user equipment failover from the first network to a second network without losing a wireless communication session with the first network.

FIG. 7 is a flow diagram illustrating an exemplary method operational in a first network device or entity (e.g., two or more network devices) that facilitates a user equipment failover from the first network (e.g., a packet-switched network) to a second network (e.g., a circuit-switched network) without losing a wireless communication session with the first network. In some examples, the first and second networks may be different types of networks (e.g., packet-switched versus circuit-switched networks). A wireless communication session and/or connection is established between a first network and a user equipment 702. The first network entity may receive a data transmission for a first service over the wireless communication session 704. If the data transmission fails, the first network entity sends a service failure indicator to the user equipment indicating that the data transmission for the first service has failed 706. For example, one example of such service failure message may be a SIP error indicator 926 in FIG. 9A. Alternatively, the user equipment may unilaterally initiate the failover even without a failure indicator having been sent by the first network entity. As a result of the failure indicator, the first network entity may receive an extended service request for a second service from the user equipment, where the second service is distinct from the first service and has the effect of suspending the wireless communication session with the user equipment 708. However, rather than carrying through with the second service, the user equipment switches to a second network. The first network maintains the wireless communication session in suspension. For example, it may buffer any paging messages for the user equipment while the wireless communication session is suspended 710. Additionally, the first network device (or first network) may preserve session context information for the wireless communication session during the suspension period. In this manner, the first network avoids sending unnecessary paging messages to the user equipment while the user equipment is not monitoring its session/connection with the first network. Subsequently, the first network entity may receive an indicator to resume the wireless communication session with the user equipment 712. A new connection may be established between the user equipment and the first network entity. The new connection may serve to reestablish or resume the previously suspended session. Thus, while a new connection may be established, session context is maintained. The first network entity may then send the buffered paging messages to the user equipment 714.

Figure 8A:
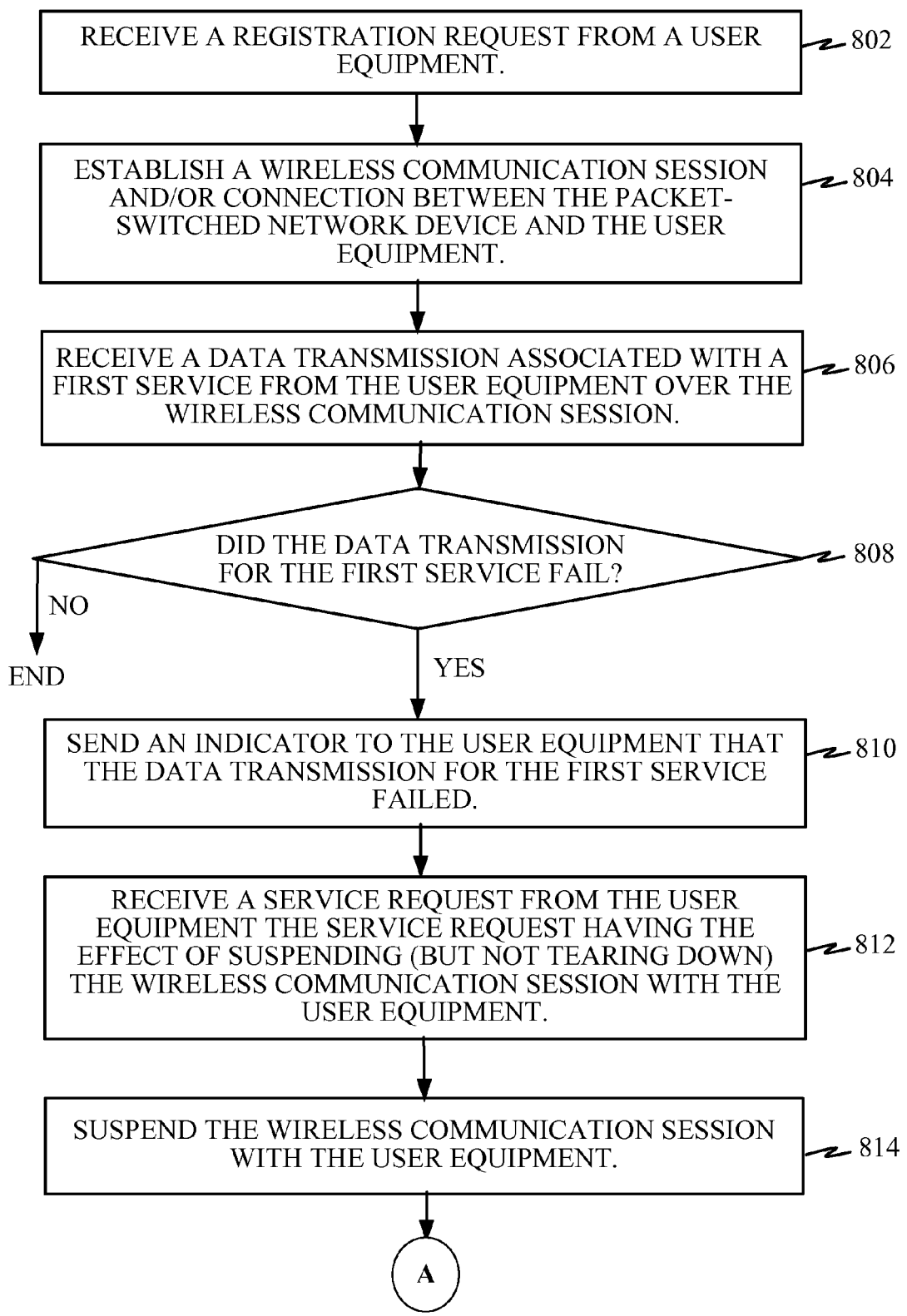
FIG. 8 (comprising FIGS. 8A and 8B) is a flow diagram illustrating another exemplary method operational on a packet-switched network device or entity to provide communication connectivity to one or more user equipment.
Figure 8B:
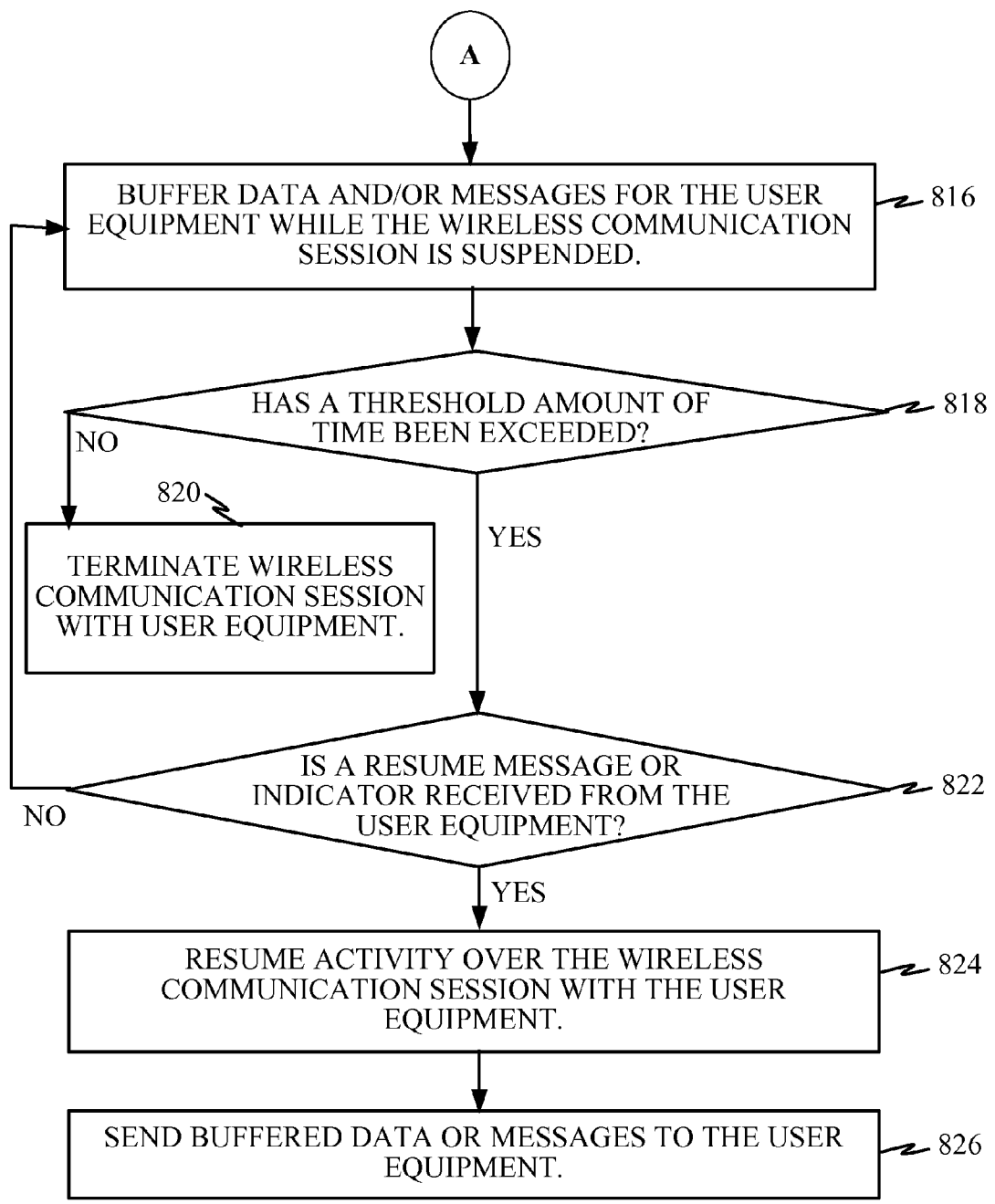

FIG. 8 (comprising FIGS. 8A and 8B) is a flow diagram illustrating another exemplary method operational on a packet-switched network device or entity to provide communication connectivity to one or more user equipment. This method may facilitate a user equipment failover from the packet-switched network to a circuit-switched network without losing a wireless communication session with the packet-switched network. In one example, the packet-switched network may be an LTE network and the circuit-switched network may be a 1xRTT network. A registration request may be received from a user equipment 802 by the packet-switched network device. After the user equipment has registered with the packet switched network, the packet-switched network device may establish a wireless communication session and/or connection with the user equipment 804. A data transmission associated with a first service may be received from the user equipment over the wireless communication connection 806.

If the data transmission for the first service fails 808 over the packet-switched network, the packet-switched network device may send an indicator to the user equipment that the data transmission for the first service failed 810. As a result, the packet-switched network device may receive a service request from the user equipment, where the service request has the direct or indirect effect of suspending (but not terminating or tearing down) the wireless communication session with the user equipment 812. Note that the connection between the user equipment and the packet-switched network device may be torn down or lost. In one example, the service request may be an extended service request (ESR) message that is typically used by a user equipment to indicate (to the packet-switched network) that it is initiating a voice call over the circuit-switched network. However, rather than actually performing the voice call over the circuit-switched network, the user equipment retries the The packet-switched network device may then suspend the wireless communication session with the user equipment 814 and/or buffer data and/or messages for the user equipment while the wireless communication connection is suspended 816. The packet-switched network device may apply a threshold or timeout timer to the suspension of the wireless communication session. If the threshold amount of time is exceeded 818, then the packet-switched network device may terminate, release, and/or end the wireless communication session with the user equipment 820. For instance, this may address the situation where the user equipment has moved out of radio reception range of the packet-switched network.

Otherwise, the packet-switched network device may monitor for reception of a resume message or indicator from the user equipment 822. Upon receipt of such resume message or indicator, the packet-switched network device may resume activity over the wireless communication session (and possibly establish a new connection) with the user equipment 824. The packet-switched network device may then send buffered data or messages (e.g., missed calls, pages, etc.) to the user equipment 826.

Exemplary LTE Packet-Switched to Circuit-Switched Network Failover System

Figure 9A:
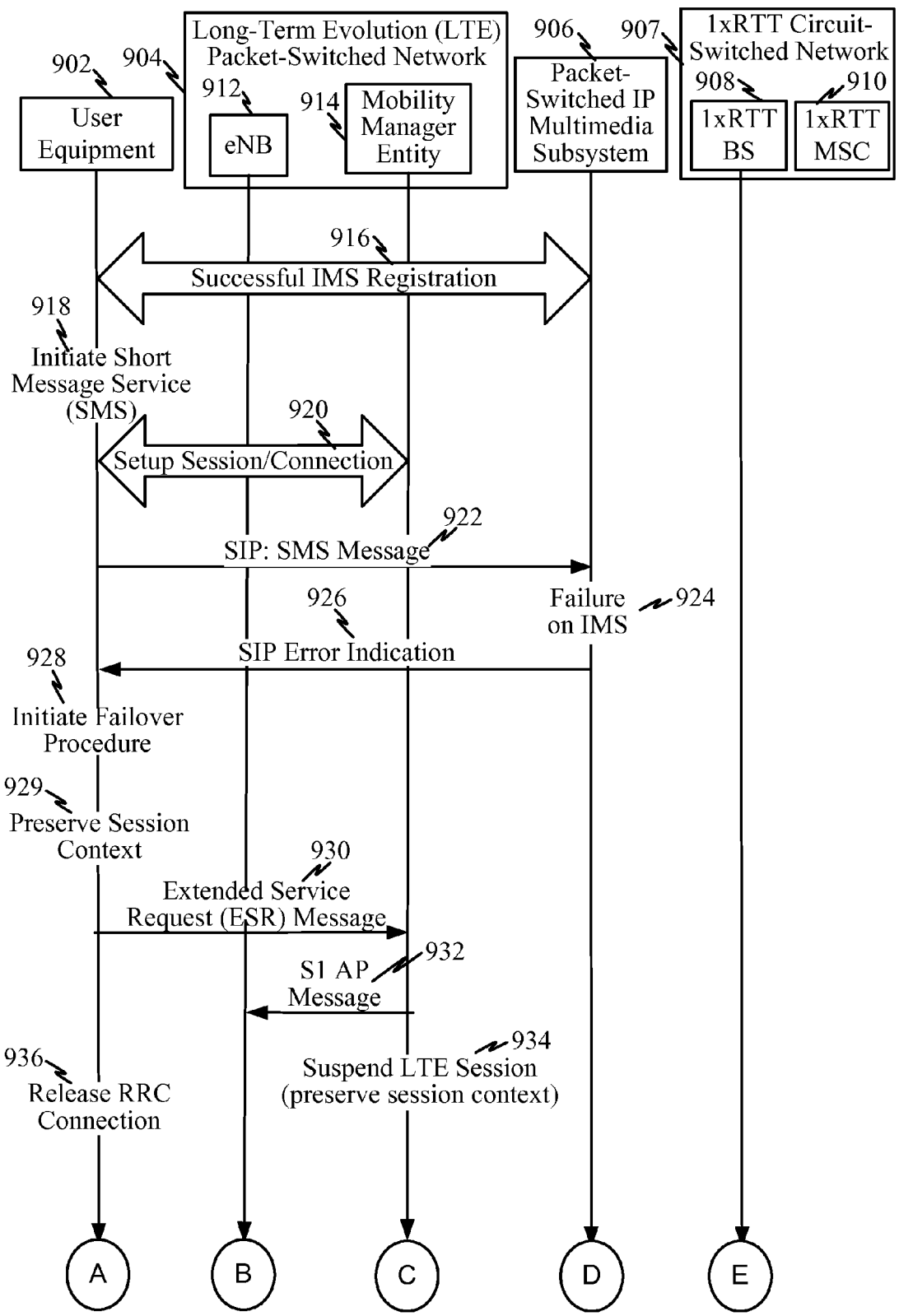
FIG. 9 (comprising FIGS. 9A and 9B) is a flow diagram illustrating the operations between a user equipment, an LTE packet-switched network, and a 1xRTT circuit-switched network to implement failover data retransmissions.
Figure 9B:
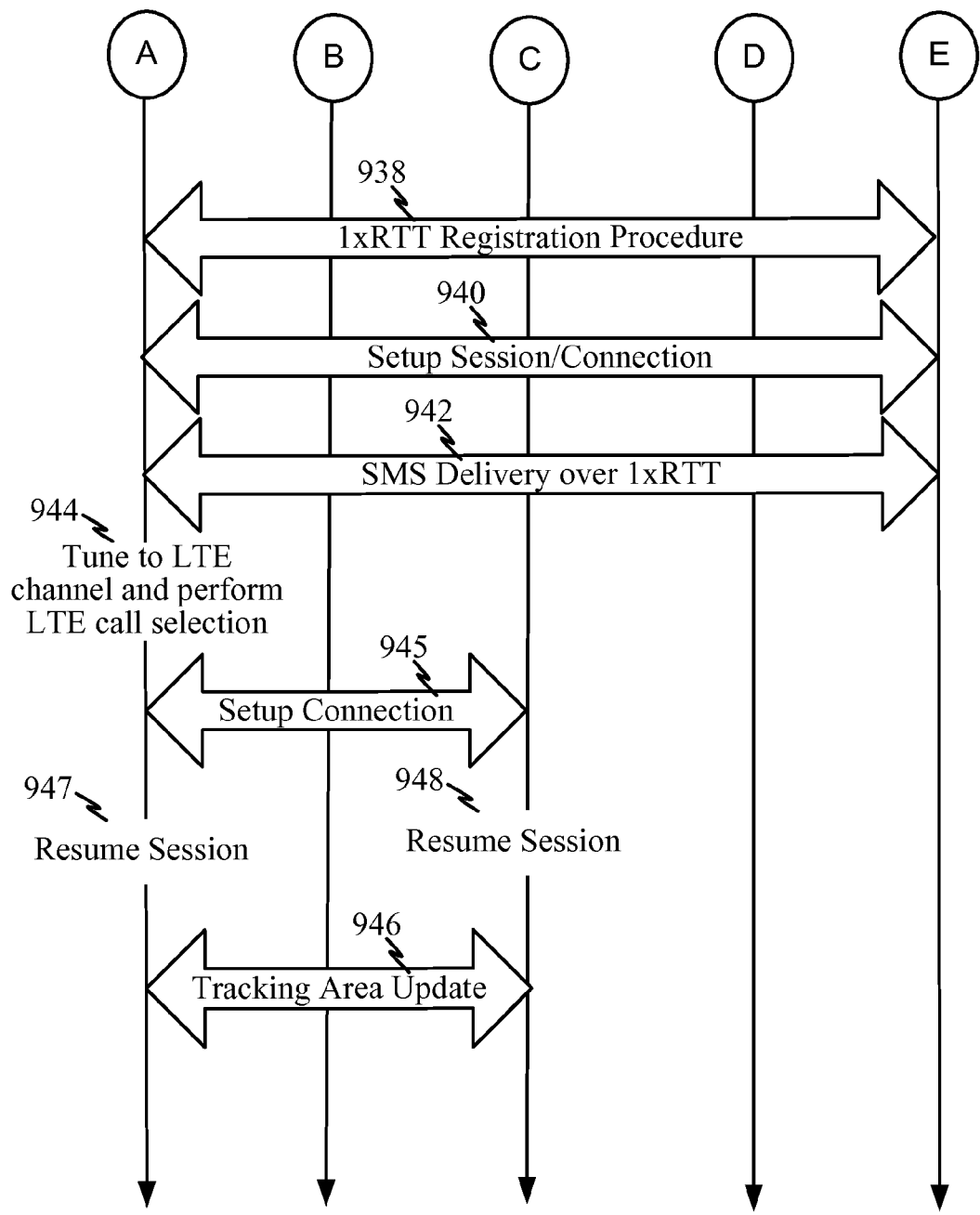

FIG. 9 (comprising FIGS. 9A and 9B) is a flow diagram illustrating the operations between a user equipment, an LTE packet-switched network 904, and a 1xRTT circuit-switched network 907 to implement failover data retransmissions. Here, a user equipment 902 may be multi-modal, allowing it to operate on either the LTE packet-switched network 904 or the 1xRTT circuit-switched network 907. In some instances, the user equipment 902 may be restricted to using either the LTE packet-switched network 904 or the 1xRTT circuit-switched network 907 at any one time (e.g., the user equipment cannot simultaneously or concurrently communicate over both networks). The LTE packet-switched network 904 may include one or more enhanced node Bs (eNB) 912 and a mobility manager entity (MME) 914. The MME 914 may be responsible for user equipment tracking and paging procedures including retransmissions. The MME 914 may be involved in bearer activation/deactivation and is also responsible for authenticating a user by interacting with a Home Subscriber Server. The LTE packet-switched network 904 may communicate with other networks over a packet-switched IP Multimedia Subsystem (IMS). The 1xRTT circuit-switched network 907 may include, for example, a 1xRTT base station (BS) and/or a 1xRTT mobile switching center (MSC) 910.

Figure 10:
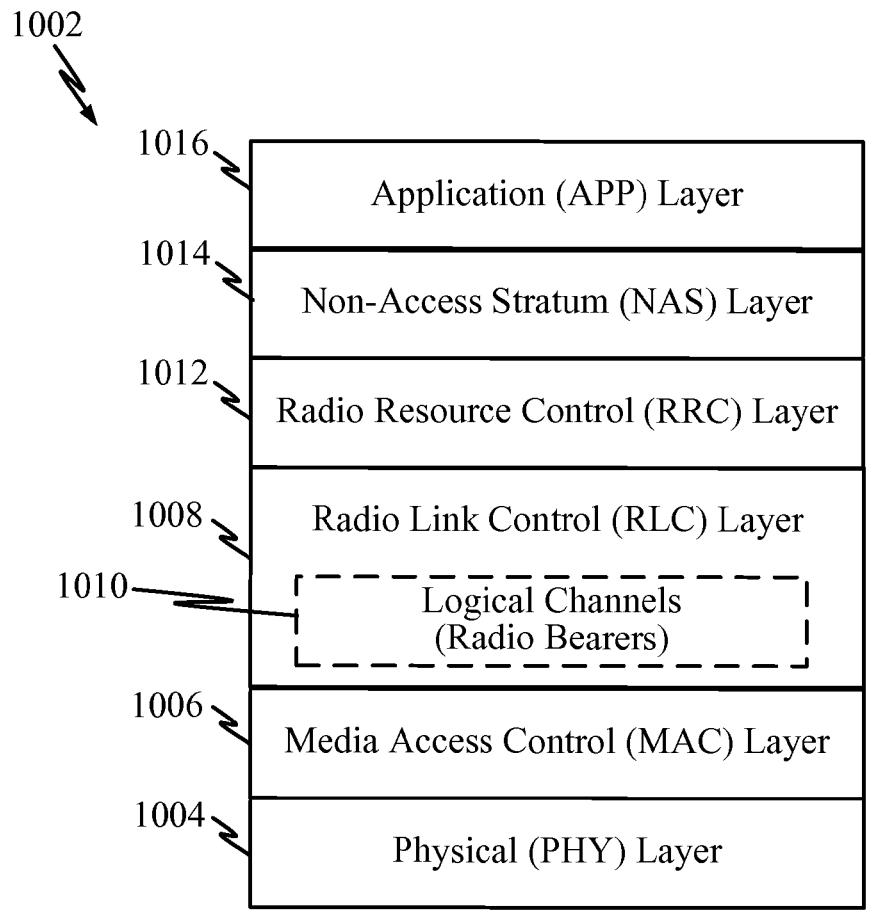
FIG. 10 illustrates an exemplary protocol stack that may be implemented in user equipment and/or eNBs for an LTE packet-switched network.

LTE packet-switched networks are structured in multiple hierarchical protocol layers, where the lower protocol layers provide services to the upper layers and each layer is responsible for different tasks. For example, FIG. 10 illustrates an exemplary protocol stack that may be implemented in user equipment and/or eNBs for an LTE packet-switched network. In this example, the LTE protocol stack 1002 includes a Physical (PHY) Layer 1004, a Media Access Control (MAC) Layer, a Radio Link Control (RLC) Layer 1008, a Radio Resource Control (RRC) Layer 1012, a Non-Access Stratum (NAS) Layer 1014, and an Application (APP) Layer 1016. The PHY Layer 1004 may be responsible for performing coding and decoding, modulation and demodulation, and/or resource mapping. The MAC Layer 1006 may be responsible for performing uplink/downlink scheduling, hybrid-ARQ retransmissions, modulation selection, and/or assigning resource. The RLC Layer 1008 may be responsible for performing segmentation/concatenation, retransmission handling, and in-sequence deliver to higher layers. The RLC Layer 1008 may include one or more logical channels that define radio bearers 1010 (e.g., signaling and/or data radio bearers). The RRC Layer 1012 may implement various monitoring modes for the user equipment, including Cell Dedicated Channel (DCH) state, Cell Forward Access Channel (FACH) state, Cell Paging Channel (PCH) state, UTRAN (UMTS Terrestrial Radio Access Network) Registration Area URA Paging Channel (URA PCH) state, and idle state. The Non-Access Stratum (NAS) Layer 1014 may maintain the user equipment's mobility management context, packet data context and/or its IP addresses. Upon suspension of a communication session, context suspension and/or preservation occurs at the NAS Layer 1014 of the user equipment. Network and/or session context information at the NAS Layer 1014 and/or higher layers (e.g., Application Layer 1016, etc.) is suspended and/or preserved. Network and/or session context information below the NAS Layer 1014 (e.g., RRC Layer 1012, RLC Layer 1008, MAC Layer 1006, and PHY Layer 1004) may be discarded or deleted by the network. Note that other layers may be present in the protocol stack 1002 (e.g., above, below, and/or in between the illustrated layers).

Referring again to FIG. 9, the user equipment 902 may perform successful IMS registration 916 over the packet-switched network 904 and IMS 906. The user equipment 902 may then wish to initiate a short message service 918. To do this, the user equipment 902 may setup a session and associated connection 920 over the LTE packet-switched network 904, including EPS bearers and radio bearers (e.g., data radio bearers DRBs and/or signaling radio bearers SRBs). Setting up a radio connection 920 is a time-consuming and extensive task. For example, this may involve Radio Resource Control (RRC) setup, security setup, and transfer of user equipment context.

The user equipment 902 may then attempt to establish a communication session by sending a Session Initiation Protocol (SIP) SMS message 922 over the packet-switched IMS 906. In some instances, the packet-switched IMS 906 or entities therein may not support the requested service or may be temporarily out of commission, causing a failure 924. Consequently, the packet-switched IMS 906 sends a SIP error indication 926 to the user equipment 902.

This error indication 926 allows the user equipment to initiate a failover procedure 928. Consequently, the user equipment 902 may preserve session context 929. The failover procedure may also involve switching from the LTE packet-switched network 904 and retrying the failed SMS message over the 1xRTT circuit-switched network 907. However, this switch from the LTE packet-switched network 904 to the 1xRTT circuit-switched network 907 may be temporary (e.g., just for retrying the SMS message). Thus, user experience may be enhanced if, after the failover, the user equipment 902 can resume its communications over the LTE packet-switched network 904 quickly and without the delay of having to completely reestablish its connection. This task is complicated in the case of the LTE packet-switched network 904 since the communication standard does not provide specific instruction, command, or protocol that allows the user equipment 902 to request suspension of a connection and, subsequently, request resumption of the same connection.

According to one implementation of the failover procedure 928, the user equipment 902 may send an extended service request (ESR) message 930 which is typically used in LTE compatible networks for initiating a voice call service. In LTE compatible packet-switched networks, the ESR message typically causes the suspension of data session(s) (but does not teardown the data session(s)) in order to setup the voice call. However, the user equipment 902 may send the ESR message 930 without intending to setup the voice call, merely using the ESR message 930 to cause the packet-switched network 904 to temporarily suspend its connection. As a result of the ESR 930, the mobility manager 914 sends a S1 Application Protocol (AP) message 932 to the eNB 912 indicating suspension of the session. The mobility manager 914 may then suspend the session 934 with the user equipment 902 (e.g., also preserving the session context from the network side). This suspension of the session with the LTE network 904 and IMS 906 preserves the session context for the user equipment 902, allowing subsequent resumption of the session without the need or delay to reestablish these. For example, mobility management context, packet data context, EPS bearer(s), and/or IP addresses within the user equipment 902 may be retained or preserved. Note that, in some cases, while the session context is preserved, the connection may be lost between the user equipment 902 and the packet-switched IMS 906. Paging may be suspended by the mobility manager entity 914 and downlink data messages to the user equipment 902 may be buffered by the packet-switched IP multimedia subsystem (IMS) 906.

The user equipment 902 may release a Radio Resource Control (RRC) connection 936 with LTE packet-switched network 904 and attempt to resend the SMS message over the 1xRTT circuit-switched network 907. For instance, the user equipment 902 may perform 1xRTT a registration procedure 938 with the 1xRTT circuit-switched network 907. Such registration procedure may involve authenticating and/or verifying the user (e.g., subscriber) and/or the user equipment 902 with the 1xRTT circuit-switched network 907. The user equipment 902 may then setup a session and/or connection 940 with the 1xRTT circuit-switched network 907 over which it may retry SMS delivery 942. That is, the SMS message 922 that failed over the LTE packet-switched network 904 and IMS 906 is resent over the 1XRTT circuit-switched network 907.

The user equipment 902 may then switch back to the LTE packet-switched network 904 and IMS 906 by tuning to an LTE channel and performing LTE cell selection 944 to setup a new connection. The previously suspended session may then be resumed 947 and 948 over the new connection. The user terminal 902 may also perform tracking area update 946.

Figure 11:
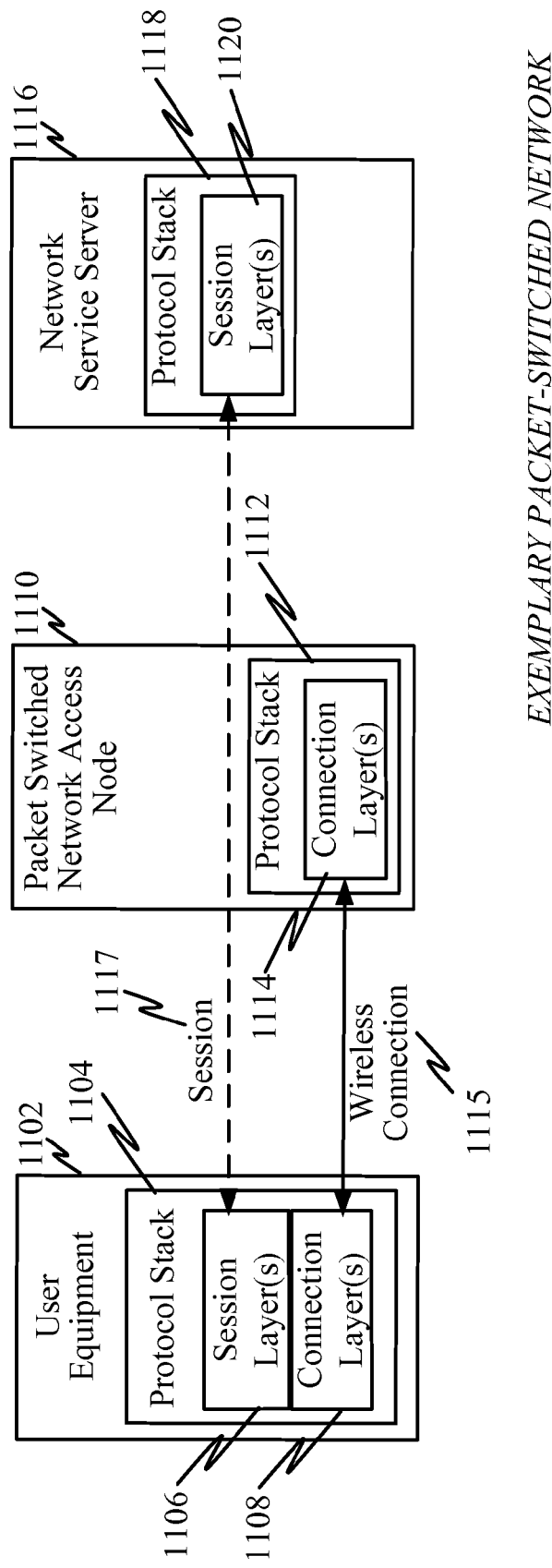
FIG. 11 is a block diagram illustrating an exemplary packet-switched network on which session preservation may occur during a failover initiated by a user equipment.

FIG. 11 is a block diagram illustrating an exemplary packet-switched network on which session preservation may occur during a failover initiated by a user equipment. The packet-switched network may include a user equipment 1102, a packet-switched network access node 1110 and a network service server 1116. The user equipment 1102 may implement or maintain a protocol stack 1104 which may include one or more session layers 1106 (e.g., layers which setup and/or maintain a data communication session with a server) and one or more connection layers 1108 (e.g., layers which setup and/or maintain a connection or link with a network). This example illustrates that a wireless connection 1115 between the user equipment 1102 and access node 1110 is setup and/or maintained between connection layers 1108 and 1114 of protocol stacks 1104 and 1112. A session 1117 between the user equipment 1102 and a service server 1116 may be setup and/or maintained via the connection 1115. The session 1117 may be established between session layers 1106 and 1120 of protocol stacks 1104 and 1118. During a failover procedure initiated by the user equipment 1102, session context for the session 1117 may be stored or preserved by the user equipment 1102 and the service server 1116. Meanwhile, the wireless connection 1115 may be torn down during such failover procedure (e.g., no connection context is preserved). The failover procedure may be, for example, one or more of the failover procedures illustrated in FIGS. 2, 4, 5, 7, 8, and/or 9. The protocol stacks 1104, 1112, and/or 1118 may be similar to, for example, the protocol stack 1002 and/or stack layers illustrated in FIG. 10.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in a figure may be configured to perform one or more of the methods, features, or steps described in another figure. The algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational on a user equipment for preserving session context during inter-radio access technology service retry, comprising:
   sending a service request for a voice call service to a packet-switched network, upon determining that a data service over a wireless communication session with the packet-switched network has failed, wherein the service request has the effect of suspending the wireless communication session with the packet-switched network, and wherein suspending the wireless communication session with the packet-switched network includes preserving context information for the wireless communication session; and
   retrying the failed data service over a circuit-switched network.

2. The method of claim 1, further comprising:
   registering the user equipment with the packet-switched network;
   establishing a wireless connection between the user equipment and the packet-switched network; and
   establishing the wireless communication session via the wireless connection.

3. The method of claim 2, wherein the wireless connection is implemented at a lower layer of a protocol stack of the user equipment than the wireless communication session.

4. The method of claim 1, further comprising:
   initiating a data transmission for the data service over the wireless communication session with the packet-switched network; and
   receiving a service failure indicator from the packet-switched network indicating that the data transmission for the data service has failed.

5. The method of claim 1, wherein ascertaining that the data service has failed over the packet-switched network includes:
   independently determining that the data service is unavailable via the packet-switched network.

6. The method of claim 1, further comprising:
   resuming use of the wireless communication session over the packet-switched network after retrying the failed data service over the circuit-switched network.

7. The method of claim 6, wherein resuming use of the wireless communication session includes:
   establishing a new wireless connection between the user equipment and the packet-switched network; and
   reestablishing the wireless communication session via the new wireless connection by using the context information for the wireless communication session preserved prior to the suspension of the wireless communication session.

8. The method of claim 1, wherein the packet-switched network is a long term evolution (LTE) packet-switched network.

9. The method of claim 1, wherein the service request is an extended service request message that is used to indicate that the user equipment is initiating a voice call service.

10. The method of claim 1, further comprising:
    foregoing subsequent steps for the voice call service to instead retry the failed data service over the circuit-switched network.

11. The method of claim 1, further comprising:
    registering the user equipment with the circuit-switched network; and
    establishing a second wireless communication session between the user equipment and the circuit-switched network.

12. The method of claim 1, wherein sending a service request for a voice call service and retrying the failed data service over the circuit-switched network is automatic and transparent to an operator of the user equipment.

13. A user equipment comprising:
    a wireless communication device for communicating over at least a packet-switched network and a circuit-switched network;
    a processing device coupled to the wireless communication device and configured to:
        send a service request for a voice call service to a packet-switched network, upon determining that a data service over a wireless communication session with the packet-switched network has failed, wherein the service request has the effect of suspending the wireless communication session with the packet-switched network, and wherein suspending the wireless communication session with the packet-switched network includes preserving context information for the wireless communication session; and
        retry the failed data service over the circuit-switched network.

14. The user equipment of claim 13, wherein the processing device is further configured to:
    resume use of the wireless communication session over the packet-switched network after retrying the failed data service over the circuit-switched network.

15. The user equipment of claim 13, wherein the service request is an extended service request that is used to indicate that the user equipment is initiating a voice call service.

16. The user equipment of claim 13, wherein the processing device is further configured to:
    establish a new wireless connection between the user equipment and the packet-switched network; and
    reestablish the wireless communication session via the new wireless connection by using the context information for the wireless communication session preserved prior to the suspension of the wireless communication session.

17. A user equipment, comprising:
    means for initiating a data transmission for a data service over a wireless communication session with a packet-switched network;
    means for sending a service request for a voice call service to the packet-switched network, upon determining that the data service over the wireless communication session with the packet-switched network has failed, wherein the service request has the effect of suspending the wireless communication session with the packet-switched network, and wherein suspending the wireless communication session with the packet-switched network includes preserving context information for the wireless communication session; and means for retrying the failed data service over a circuit-switched network.

18. The user equipment of claim 17, further comprising:
means for receiving a service failure indicator from the packet-switched network indicating that the data transmission for the data service has failed.

19. The user equipment of claim 18, further comprising:
means for resuming use of the wireless communication session over the packet-switched network after retrying the failed data service over the circuit-switched network.

20. A non-transitory processor-readable medium having one or more instructions operational on a user equipment for facilitating transparent retransmission of a failed service, which when executed by a processor causes the processor to:
initiate a data transmission for a data service over a wireless communication session with a packet-switched network;
send a service request for a voice call service to the packet-switched network, upon determining that the data service over the wireless communication session with the packet-switched network has failed, wherein the service request has the effect of suspending the wireless communication session with the packet-switched network, and wherein suspending the wireless communication session with the packet-switched network includes preserving context information for the wireless communication session; and
retry the failed data service over a circuit-switched network.

21. The processor-readable medium of claim 20, having one or more additional instructions, which when executed by the processor causes the processor to:
resume use of the wireless communication session over the packet-switched network after retrying the failed data service over the circuit-switched network.

22. A method operational on a packet-switched network device for a packet-switched network, comprising:
receiving a data transmission for a data service over a wireless communication session with a user equipment;
sending a service failure indicator to the user equipment indicating that the data transmission for the data service has failed; and
receiving a service request for a voice call service from the user equipment, wherein the service request has the effect of suspending the wireless communication session with the user equipment, and wherein suspending the wireless communication session with the user equipment includes preserving context information for the wireless communication session.

23. The method of claim 22, further comprising:
buffering one or more paging messages for the user equipment while the wireless communication session is suspended.

24. The method of claim 23, further comprising:
receiving an indicator to resume the wireless communication session with the user equipment.

25. The method of claim 24, further comprising:
sending the buffered paging messages to the user equipment.

26. The method of claim 24, further comprising:
resuming activity over the wireless communication session with the user equipment.

27. The method of claim 26, wherein resuming use of the wireless communication session includes:
establishing a new wireless connection between the user equipment and the packet-switched network; and
reestablishing the wireless communication session via the new wireless connection by using context information for the wireless communication session preserved prior to the suspension of the wireless communication session.

28. The method of claim 22, further comprising:
receiving a registration request from the user equipment; and establishing the wireless communication session between the user equipment and the packet-switched network.

29. The method of claim 22, further comprising:
terminating the wireless communication session if it has been suspended for longer than a threshold amount of time.

30. The method of claim 22, wherein the packet-switched network is a long term evolution (LTE) packet-switched network.

31. The method of claim 22, wherein during suspension of the wireless communication session with the packet-switched network, the user equipment resends the data transmission for the data service over a circuit-switched network.

32. The method of claim 22, wherein the service request for the voice call service is an extended service request that is used to indicate that the user equipment is initiating a voice call service.

33. A packet-switched network entity comprising:
a wireless communication device for communicating with one or more user equipment and a core network;
a processing device coupled to the wireless communication device and configured to:
receive a data transmission for a data service over a wireless communication session with a user equipment;
send a service failure indicator to the user equipment indicating that the data transmission for the data service has failed; and
receive a service request for a voice call service from the user equipment, wherein the service request has the effect of suspending the wireless communication session with the user equipment, and wherein suspending the wireless communication session with the user equipment includes preserving context information for the wireless communication session.

34. The packet-switched network entity of claim 33, wherein the processing device is further configured to:
buffer one or more paging messages for the user equipment while the wireless communication session is suspended.

35. The packet-switched network entity of claim 34, wherein the processing device is further configured to:
receive an indicator to resume the wireless communication session with the user equipment.

36. The packet-switched network entity of claim 35, wherein the processing device is further configured to:
send the buffered paging messages to the user equipment.

37. The packet-switched network entity of claim 35, wherein the processing device is further configured to:
resume activity over the wireless communication session with the user equipment.

38. The packet-switched network entity of claim 33, wherein during suspension of the wireless communication session with a packet-switched network, the user equipment resends the data transmission for the data service over a circuit-switched network.

39. The packet-switched network entity of claim 33, wherein the core network includes an internet protocol multimedia subsystem (IMS).

40. A packet-switched network entity for a first network, comprising:
- means for receiving a data transmission for a data service over a wireless communication session with a user equipment;
- means for sending a service failure indicator to the user equipment indicating that the data transmission for the data service has failed; and
- means for receiving a service request for a voice call service from the user equipment, wherein the service request has the effect of suspending the wireless communication session with the user equipment, and wherein suspending the wireless communication session with the user equipment includes preserving context information for the wireless communication session.

41. The packet-switched network entity of claim 40, further comprising:
- means for buffering paging messages for the user equipment while the wireless communication session is suspended.

42. The packet-switched network entity of claim 40, further comprising:
- means for receiving an indicator to resume the wireless communication session with the user equipment.

43. The packet-switched network entity of claim 40, further comprising:
- means for resuming activity over the wireless communication session with the user equipment.

44. A non-transitory processor-readable medium having one or more instructions operational on a packet-switched network entity for facilitating transparent retransmission of a failed service by a user equipment, which when executed by a processor causes the processor to:
- receiving a data transmission for a data service over a wireless communication session with a user equipment;
- send a service failure indicator to the user equipment indicating that the data transmission for the data service has failed; and
- receive a service request for a voice call service from the user equipment, wherein the service request has the effect of suspending the wireless communication session with the user equipment, and wherein suspending the wireless communication session with the user equipment includes preserving context information for the wireless communication session.

45. The processor-readable medium of claim 44, having one or more additional instructions, which when executed by the processor causes the processor to:
- resume use of the wireless communication session over a packet-switched network after resending the data transmission over a circuit-switched network.

* * * * *